United States Patent
Tao et al.

(10) Patent No.: US 11,860,444 B2
(45) Date of Patent: Jan. 2, 2024

(54) ELECTRONIC DEVICES WITH COVERING STRUCTURES

(71) Applicant: Apple Inc., Cupertino, CA (US)

(72) Inventors: Yiwei Tao, Cupertino, CA (US); Vedant A. Dhandhania, Cupertino, CA (US); Timon A. Wright, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 235 days.

(21) Appl. No.: 17/185,743

(22) Filed: Feb. 25, 2021

(65) Prior Publication Data

US 2021/0325631 A1  Oct. 21, 2021

Related U.S. Application Data

(60) Provisional application No. 63/010,545, filed on Apr. 15, 2020.

(51) Int. Cl.
  *G02B 7/12* (2021.01)
  *G02B 25/00* (2006.01)
  *G02B 7/02* (2021.01)

(52) U.S. Cl.
  CPC .................. *G02B 7/12* (2013.01); *G02B 7/02* (2013.01); *G02B 25/001* (2013.01)

(58) Field of Classification Search
  CPC . G02B 7/02; G02B 7/12; G02B 7/023; G02B 7/026; G02B 25/00; G02B 25/001; G02B 27/01; G02B 27/017; G02B 27/0172; G02B 27/0176; G02B 2027/0154; G06F 3/01; G06F 3/011; G06F 1/16; G06F 1/1656; G06F 1/163; G06F 1/20; G06F 1/203; G06K 19/07; G06K 19/0723; G06K 7/10; G06K 7/10297
  USPC .................. 359/480, 481, 13, 630–633, 815; 345/7–9; 348/115, 116
  See application file for complete search history.

(56) References Cited

U.S. PATENT DOCUMENTS

| | | | |
|---|---|---|---|
| 5,539,422 A | 7/1996 | Heacock et al. | |
| 5,954,642 A | 9/1999 | Johnson et al. | |
| 5,991,085 A | 11/1999 | Rallison et al. | |
| 6,452,572 B1 | 9/2002 | Fan et al. | |
| 8,964,298 B2 | 2/2015 | Haddick et al. | |
| 9,151,954 B2 | 10/2015 | Magyari et al. | |
| 10,261,555 B1* | 4/2019 | Cooper | G06F 1/163 |
| 2016/0011422 A1 | 1/2016 | Thurber et al. | |

(Continued)

FOREIGN PATENT DOCUMENTS

| | | |
|---|---|---|
| CN | 105934134 A | 9/2016 |
| CN | 106104361 A | 11/2016 |

(Continued)

*Primary Examiner* — Jie Lei
(74) *Attorney, Agent, or Firm* — Treyz Law Group, P.C.; G. Victor Treyz; Kendall P. Woodruff

(57) ABSTRACT

Electronic devices such as head-mounted electronic devices may include displays for presenting images to users. To accommodate variations in the interpupillary distances associated with different users, a head-mounted device may have left-eye and right-eye optical modules that move with respect to each other. To hide internal structures from view, the rear of a head-mounted device may be provided with a cover. The cover may have a stretchable layer that is coupled to a frame. Openings in the stretchable layer may be aligned with the optical modules.

18 Claims, 12 Drawing Sheets

(56) References Cited

U.S. PATENT DOCUMENTS

| | | | |
|---|---|---|---|
| 2016/0366399 A1 | 12/2016 | Tempel et al. | |
| 2017/0192198 A1 | 7/2017 | Bristol et al. | |
| 2018/0095498 A1* | 4/2018 | Raffle | G02B 27/0176 |
| 2019/0129181 A1* | 5/2019 | Polcak | G02B 27/0093 |
| 2019/0369353 A1 | 12/2019 | Franklin et al. | |
| 2020/0026079 A1 | 1/2020 | Franklin et al. | |
| 2020/0081259 A1 | 3/2020 | Jo et al. | |

FOREIGN PATENT DOCUMENTS

| | | |
|---|---|---|
| CN | 108474952 A | 8/2018 |
| CN | 109791292 A | 5/2019 |
| CN | 209014815 U | 6/2019 |
| CN | 209311784 U | 8/2019 |
| CN | 110573065 A | 12/2019 |
| CN | 209821509 U | 12/2019 |

\* cited by examiner

ELECTRONIC DEVICES WITH COVERING STRUCTURES

This application claims the benefit of provisional patent application No. 63/010,545, filed Apr. 15, 2020, which is hereby incorporated by reference herein in its entirety.

FIELD

This relates generally to electronic devices, and, more particularly, to wearable electronic devices such as head-mounted devices.

BACKGROUND

Electronic devices such as head-mounted devices are configured to be worn on a head of a user. A head-mounted device may have left and right optical systems for presenting images to a user's left and right eyes. Not all users have the same physical distance separating their eyes. To accommodate differences in interpupillary distance between different users, a head-mounted device may have a mechanism for adjusting the positions of the left and right optical systems.

SUMMARY

Electronic devices such as head-mounted electronic devices may include displays for presenting images to users. To accommodate variations in the interpupillary distances associated with different users, a head-mounted device may have left-eye and right-eye optical modules that move with respect to each other. Each optical module may include a display device for producing an image and an associated optical component such as a lens for providing the image to an associated eye box in which an eye of the user is located for viewing the image. The optical modules, which may sometimes be referred to as optical systems, display systems, lens systems, lens and display assemblies, etc., may each have a support structure such as a lens barrel that supports a respective display and lens.

Actuators may be used to position the lens barrels within the housing of a head-mounted device. To hide the actuators and other electrical components such as integrated circuits, batteries, sensors, etc. and to hide potentially unsightly internal housing structures from view, the rear of a head-mounted device that faces the user may be provided with a cosmetic covering. Openings in the cosmetic covering may receive the lens barrels of the optical modules. The cosmetic covering may be configured to accommodate movement in the positions of the optical modules for different interpupillary distances.

DETAILED DESCRIPTION

An electronic device such as a head-mounted device may have a front face that faces away from a user's head and may have an opposing rear face that faces the user's head. Optical modules on the rear face may be used to provide images to a user's eyes. The positions of the optical modules may be adjusted to accommodate different user interpupillary distances. Internal device structures may be hidden from view by the user by covering the rear face of the device with a curtain. The curtain, which may sometimes be referred to as a cover, covering structure, rear housing cover, rear housing wall, rear housing structure, cosmetic covering, etc., may help block potentially unsightly internal structures from view, while accommodating movement of the optical modules.

Figure 1:
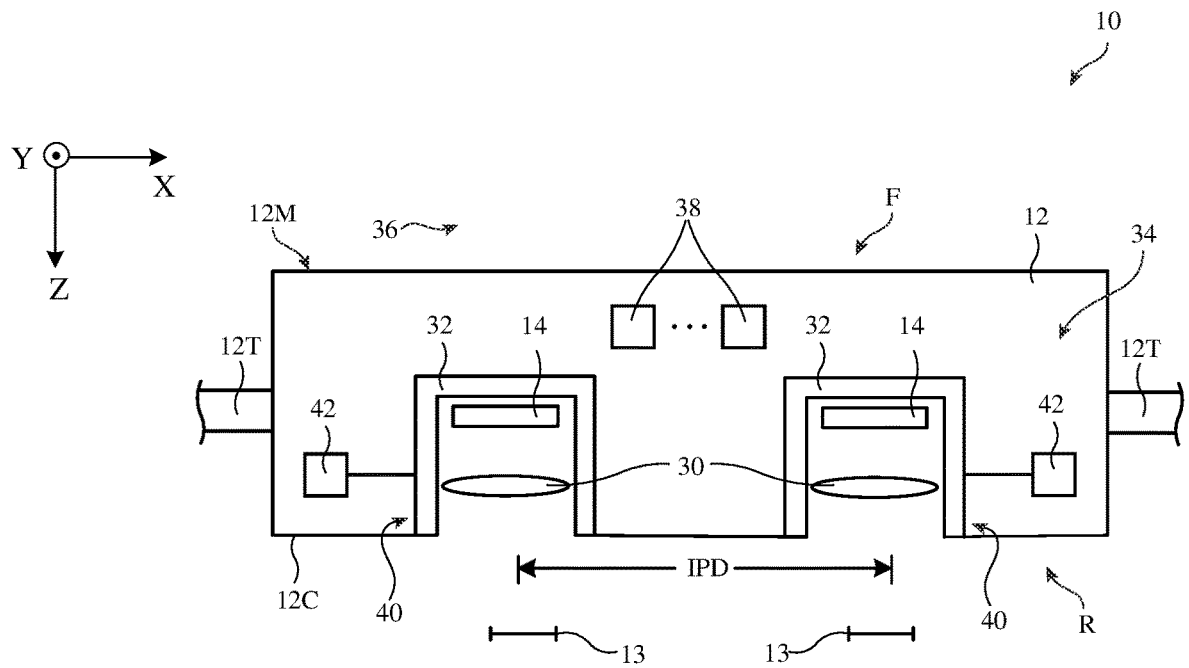
FIG. 1 is a top view of an illustrative head-mounted device in accordance with an embodiment.

A top view of an illustrative head-mounted device with a curtain is shown in FIG. 1. As shown in FIG. 1, head-mounted devices such as electronic device 10 may have head-mounted support structures such as housing 12. Housing 12 may include portions (e.g., support structures 12T) to allow device 10 to be worn on a user's head. Support structures 12T may be formed from fabric, polymer, metal, and/or other material. Support structures 12T may form a strap or other head-mounted support structures that help support device 10 on a user's head. A main support structure (e.g., main housing portion 12M) of housing 12 may support electronic components such as displays 14. Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as curtain 12C. In an illustrative configuration, curtain 12C includes a fabric layer that separates interior region 34 from the exterior region to the rear of device 10. Other structures may be used in forming curtain 12C, if desired. The presence of curtain 12C on rear face R may help hide internal housing structures, internal components 38, and other structures in interior region 34 from view by a user.

Device 10 may have left and right optical modules 40. Each optical module may include a respective display 14, lens 30, and support structure 32. Support structures 32, which may sometimes be referred to as lens barrels or optical module support structures, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30. Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images. Lenses 30 may include one or more lens elements for providing image light from displays 14 to respective eyes boxes 13. Lenses may be implemented using refractive glass lens elements, using mirror lens structures (catadioptric lenses), using holographic lenses, and/or other lens systems. When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

Not all users have the same interpupillary distance IPD. To provide device 10 with the ability to adjust the interpupillary spacing between modules 40 along lateral dimension X and thereby adjust the spacing IPD between eye boxes 13 to accommodate different user interpupillary distances, device 10 may be provided with actuators 42. Actuators 42 can be manually controlled and/or computer-controlled actuators (e.g., computer-controlled motors) for moving support structures 32 relative to each other.

Figure 2:
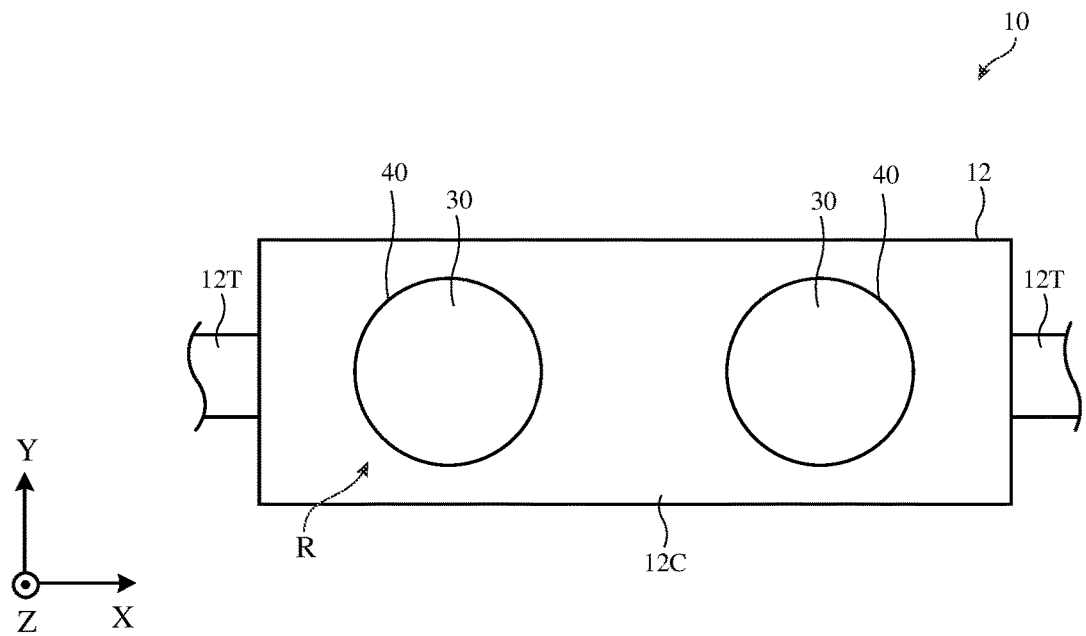
FIG. 2 is a rear view of an illustrative head-mounted device in accordance with an embodiment.

As shown in FIG. 2, curtain 12C may cover rear face F while leaving lenses 30 of optical modules 40 uncovered (e.g., curtain 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other. To prevent undesired wrinkling and buckling of curtain 12C as optical modules 40 are moved relative to rigid portions of housing 12M and relative to each other, a fabric layer or other cover layer in curtain 12C may be configured to slide, stretch, open/close, and/or otherwise adjust to accommodate optical module movement.

Figure 3:
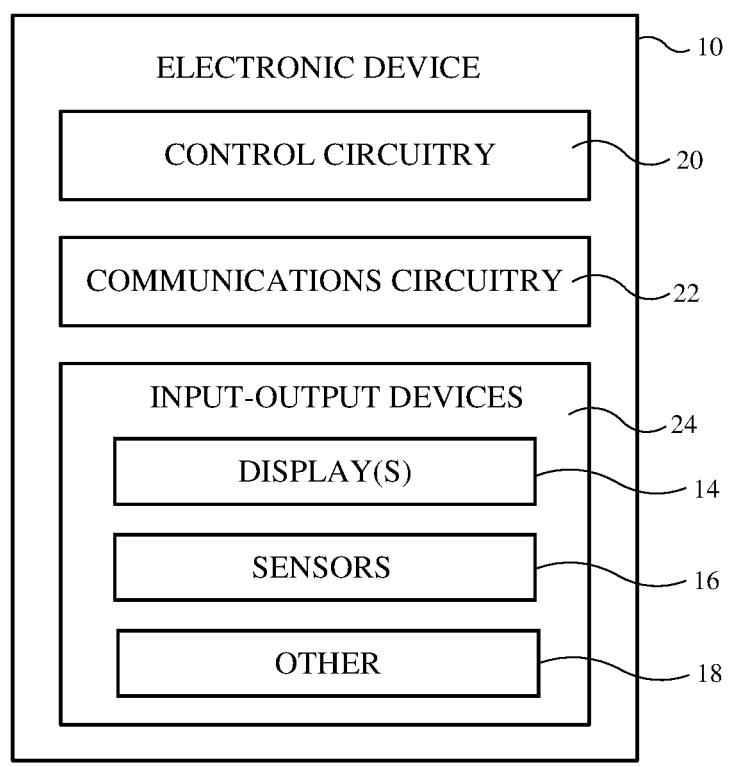
FIG. 3 is a schematic diagram of an illustrative head-mounted device in accordance with an embodiment.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 4:
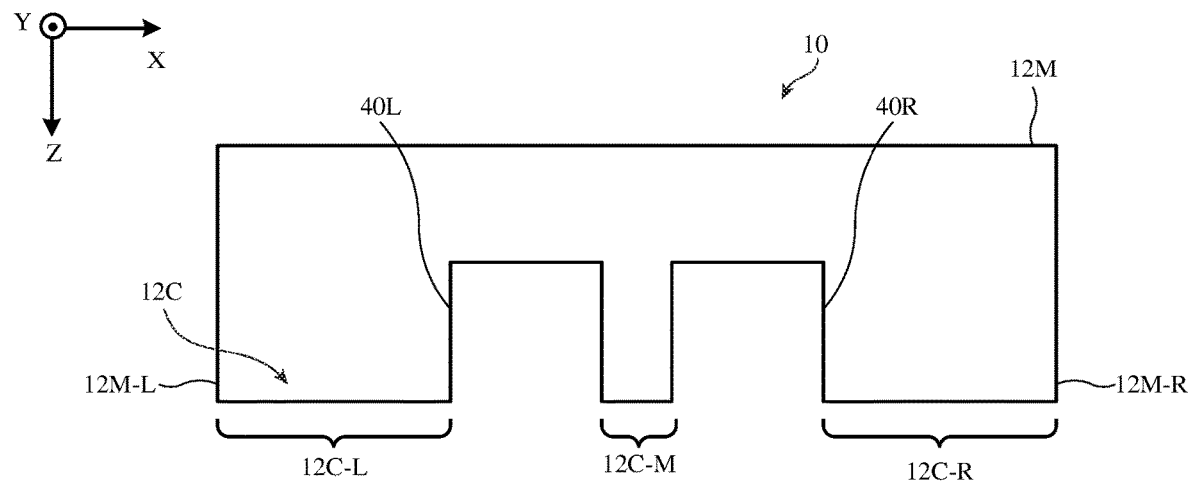
FIG. 4 is a top view of an illustrative head-mounted device in which left-eye and right-eye optical modules have been placed close to each other to accommodate a user with a small interpupillary distance in accordance with an embodiment.
Figure 5:
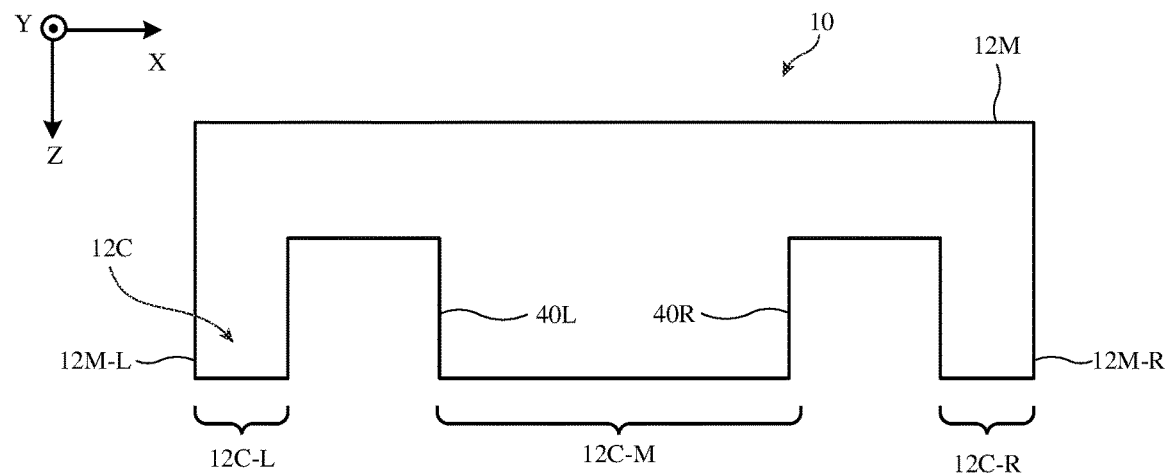
FIG. 5 is a top view of the illustrative head-mounted device of FIG. 4 in which the optical modules have been moved away from each other to accommodate a user with a large interpupillary distance in accordance with an embodiment.

FIGS. 4 and 5 are top views of device 10 showing how the optical modules of device 10 move with respect to each other along lateral dimension X to accommodate different interpupillary distances IPD (the distance between a user's left and right eyes). In the example of FIG. 4, left optical module 40L and right optical module 40R have been moved towards each other to accommodate a small interpupillary distance. In the example of FIG. 5, left optical module 40L and right optical module 40R have been moved away from each other to accommodate a large interpupillary distance.

Curtain 12C has edge portions such as left portion 12C-L between left housing wall 12M-L and left optical module 40L and right portion 12C-R between right housing wall 12M-R and right optical module 40R. Middle potion 12C-M of curtain 12C extends between left optical module 40L and right optical module 40R. In the configuration of FIG. 4, optical modules 40L and 40R are relatively close to each other, so middle portion 12C-M is relatively small and portions 12C-L and 12C-R are relatively large. In the configuration of FIG. 5, optical modules 40L and 40R are relatively far from each other, so left portion 12C-L and right portion 12C-R are shorter along lateral dimension X and middle portion 12C-M has been enlarged relative to the configuration of FIG. 4.

To help accommodate differences in size for curtain 12C (e.g., length changes for portions of curtain 12M along lateral dimension X), curtain 12C may include a cover layer formed from a stretchable material such as fabric. The cover layer may be supported by a rigid frame. The fabric may be provided with a peripheral elastic band that helps allow the fabric to slide relative to the frame while being retained securely on the frame, thereby further helping curtain 12M to be dynamically adjusted without exhibiting undesired buckling and wrinkling.

Figure 6:
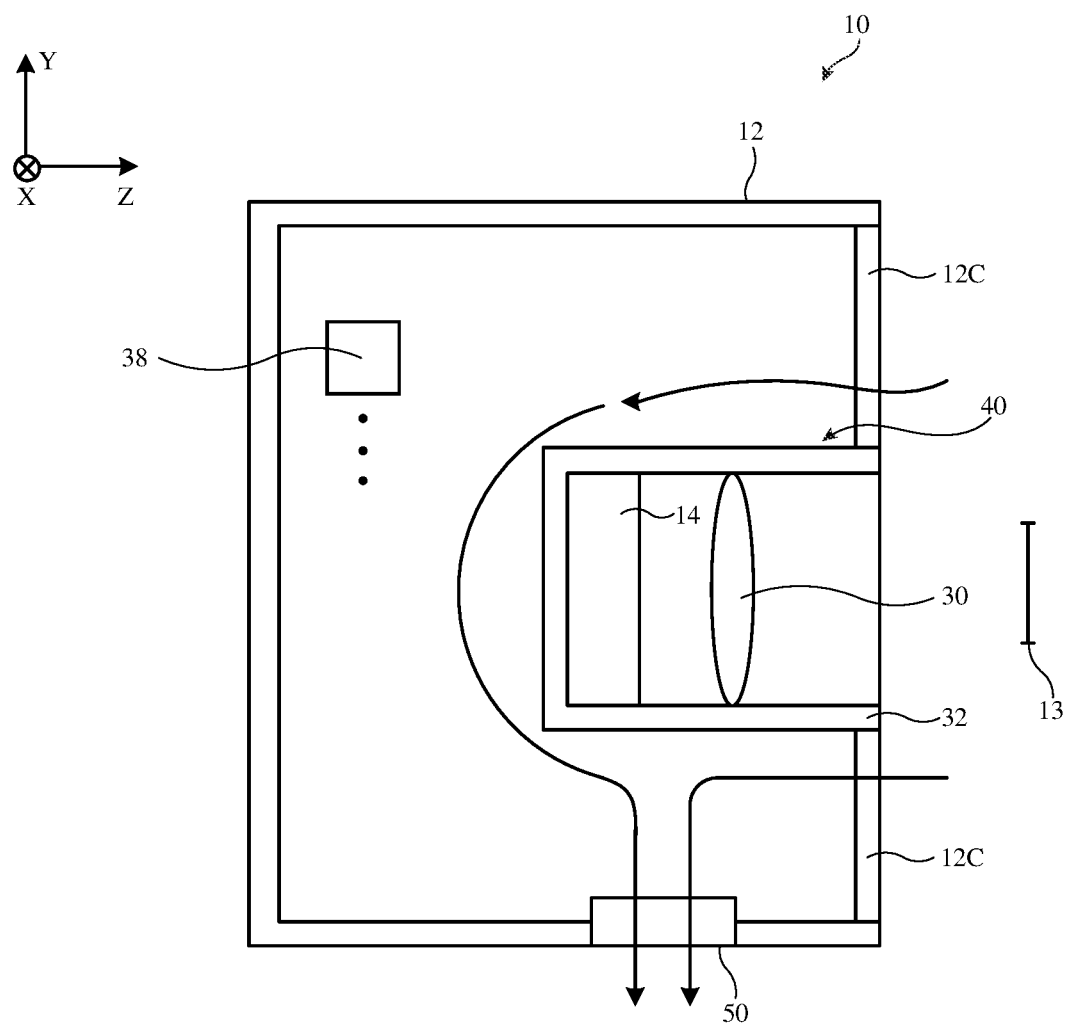
FIG. 6 is a cross-sectional side view of an illustrative head-mounted device with a fan for promoting air flow to cool internal electrical components in accordance with an embodiment.

FIG. 6 is a side view of device 10 showing how device 10 may, if desired, include cooling features to help cool display 14 and other internal components 38. As shown in FIG. 6, for example, device 10 may have a fan such as fan 50. Fan 50 may be mounted in housing 12 (e.g., a fan housing in housing 12, etc.) in a configuration that allows fan 50 to expel air from housing 12. To allow cool air to move past the face of the user while cooling electrical components in interior region 34 such as internal components 38 and display 14, curtain 12C may be permeable to air. Curtain 12C may, as an example, have one or more air-flow-promotion openings. In an illustrative configuration, curtain 12C is formed from knit or woven fabric that has a sufficiently loose knit or weave to allow air to flow through the interstitial gaps between adjacent strands of material in the fabric (e.g., between warp and weft strands). Openings may also be formed by laser cutting and/or other opening formation techniques. In configurations in which curtain 12C is permeable to air, air may flow into device 10 through curtain 12C, may flow past display 14 and other internal components 38, and may exit interior region 34 through fan 50. Air may flow in this way to cool device 10 while device 10 is being worn on a head of a user. If desired, housing 12 may have additional openings (e.g., slot shaped openings on an upper wall, side wall, and/or lower wall) that provide additional pathways for air flow.

Figure 7:
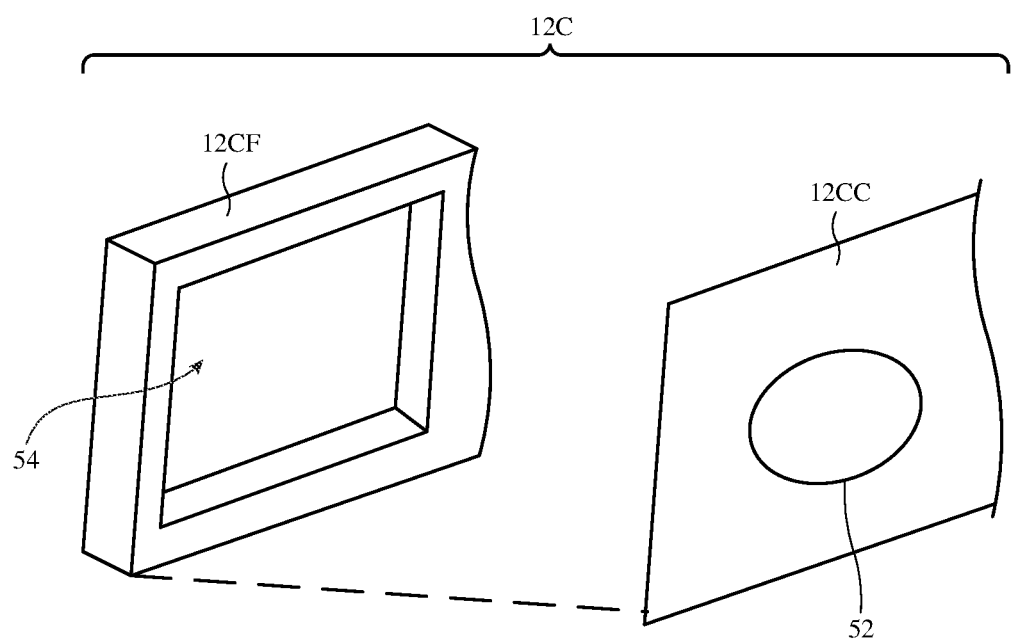
FIG. 7 is an exploded perspective view of an illustrative curtain having a frame and a cover layer that may be supported on the frame in accordance with an embodiment.

To allow a cover layer in curtain 12C to slide back and forth during adjustments to the positions of modules 40, curtain 12C may be provided with a rigid frame that supports the cover layer without excessively restricting lateral motion of the cover layer. FIG. 7 is an exploded perspective view of a left-hand portion of an illustrative curtain. As shown in FIG. 7, curtain 12C may include frame 12CF and cover layer 12CC. Cover layer 12CC may have left and right openings such as lens barrel opening 52 to receive respective left and right optical modules 40. Frame 12CF may have corresponding left and right openings such as illustrative opening 54. Opening 54 may be larger than opening 52 to accommodate lateral movement of module 40. When mounted in device 10, cover layer 12CC may be attached to frame 12CF so that cover layer 12CC can stretch and/or slide relative to frame 12CF.

Figure 8:
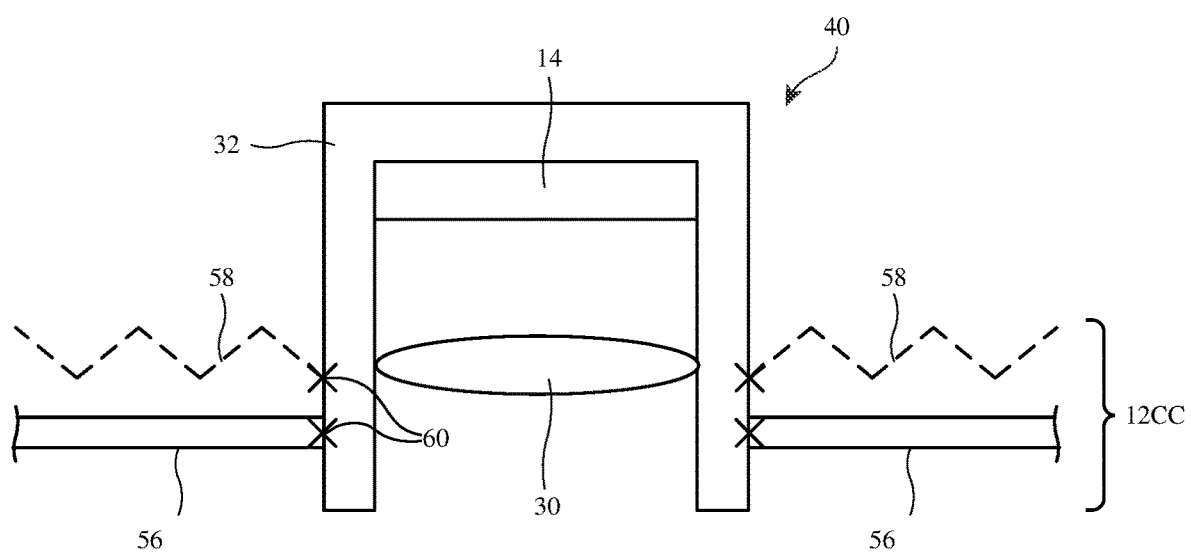
FIG. 8 is a top view of an illustrative optical module and cover layer in accordance with an embodiment.

If desired, cover layer 12CC may include multiple layers of material. As shown in the top view of FIG. 8, for example, cover layer 12CC may, include outer layer 56 and inner layer 58. Outer layer 56 may be, for example, a fabric layer. Inner layer 58 may be, for example, a layer of fabric formed form polymer strands that have been thermally formed into an accordion shape. In this type of arrangement, outer layer 56 may be a fabric with a desired visual appearance, whereas inner layer 58 may be a fabric or other layer that provides cover layer 12CC with a desired opacity to help block internal device components from view. Layer 12CC may be attached to module 40 using attachment structures 60. Structures 60 may include retention rings, screws and other fasteners, clips, and other structures that mechanically attach layer 12CC to support structures 32 of module 40 and/or may include adhesive for attaching layer 12CC to module 40.

Figure 9:
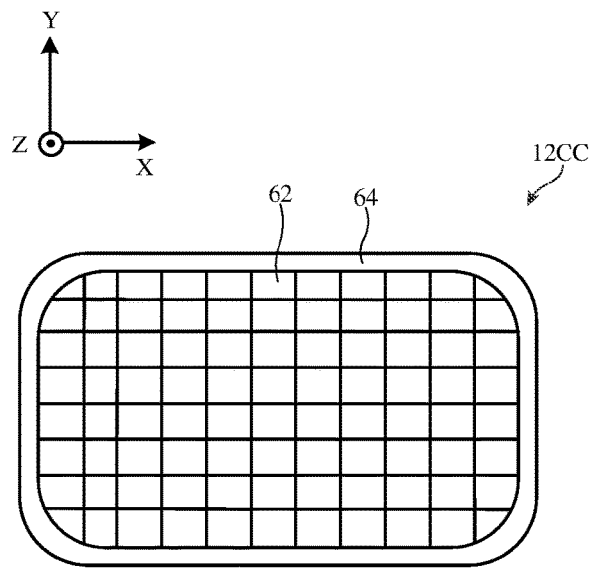
FIG. 9 is a view of an illustrative cover layer with a peripheral elastic band in accordance with an embodiment.

If desired, layer 12CC may be provided with a peripheral elastic band. This type of arrangement is shown in FIG. 9. As shown in FIG. 9, cover layer 12CC may have fabric 62 and peripheral elastic band 64. Fabric 62 may be warp knit fabric, weft knit fabric, or other knit fabric (e.g., to promote stretchiness), may be woven fabric, braided fabric, non-woven fabric, etc. If desired, a layer of stretchy plastic may be attached to fabric 62 and/or an elastomeric polymer layer may be used in place of some or all of fabric 62 in forming layer 12CC. Fabric 62 may be formed from interlaced (intertwined) strands of material such as polymer strands, strands of cotton or other natural material, synthetic material, and/or other materials. The strands in fabric 62 may include monofilament strands and/or multi-filament strands. In an illustrative configuration, some of the strands of fabric 62 may be selected to provide fabric 62 with strength, whereas other strands in fabric 62 may be formed from elastomeric material that enhances the ability of fabric 62 to stretch (and that has a lower elastic modulus than the strands that provide fabric 62 with strength). Examples of stretchable strand materials include elastomeric materials such as silicone and thermoplastic polyurethane (TPU). Examples of strength-enhancing strand materials include polyester, nylon, etc. Elastic band 64 may be formed from a strand of elastomeric material such as a strand of silicone or thermoplastic polyurethane or other stretchable material. Other materials may be used in forming the strands in fabric 62, if desired.

Figure 10:
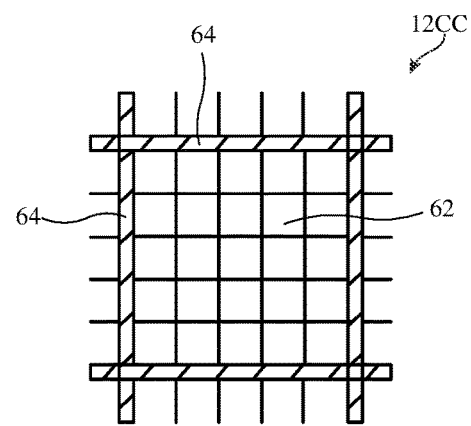
FIG. 10 is a view of an illustrative cover layer with woven elastic strands forming a peripheral elastic band in accordance with an embodiment.

Elastic band 64 may be attached to along the outer edge of fabric 62 by sewing, by knitting band 64 into a knit fabric, using adhesive, using crimped connections or other fasteners, and/or by otherwise attaching band 64 to the periphery of fabric 62. If desired, band 64 may be formed from warp strands and weft strands in a woven fabric (see, e.g., band 64 of fabric 62 of FIG. 10).

Figure 11:
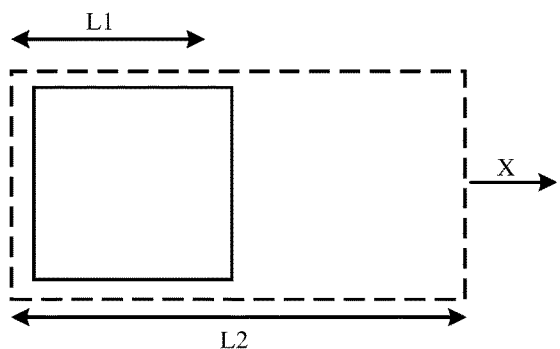
FIG. 11 is a diagram showing how a cover layer may be formed from a material that stretches in accordance with an embodiment.

The fabric or other material forming cover layer 12CC may be stretchable. As shown in FIG. 11, for example, layer 12CC may be configured to be stretched without damage from a first shape characterized by length L1 along dimension X to a second larger shape characterized by length L2 along dimension X. The amount of stretching (L2/L1) that layer 12CC may accommodate may be, for example, at least 50%, at least 75%, at least 100%, or at least 150%.

When attaching cover layer 12CC to frame 12CF, band 64 may fit over the outside of frame 12CF. Band 64 may then tug inwardly on the portions of cover layer 12CC that overlap the edges of the frame. This, in turn, will help to tension the main portion of layer 12CC outwardly (e.g., in lateral dimensions X and Y), thereby ensuring that cover layer 12CC will remain taut. At the same time, there may be at least some allowed lateral slippage of layer 12CC back and forth as needed to accommodate changes in the positions of modules 40.

Figure 12:
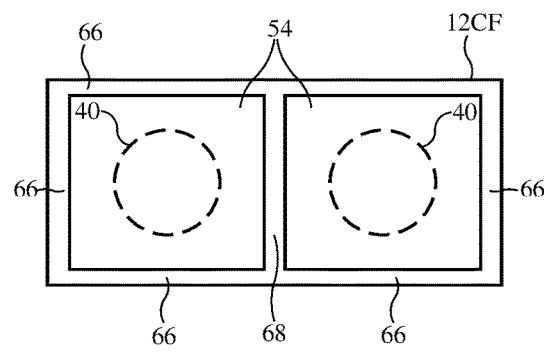
FIG. 12 is a view of an illustrative frame for a curtain in accordance with an embodiment.

An illustrative shape for frame 12CF of curtain 12C is shown in FIG. 12. As shown in FIG. 12, frame 12CF may have left and right openings 54 to overlap the desired range of positions achievable by modules 40. Frame 12CF may have an outer ring-shaped portion 66 bridged in the portion of frame 12CF that overlaps the user's nose by bridging middle portion 68. Openings 54 may be rectangular, oval, teardrop shaped, circular, and/or may have other suitable shapes.

Figure 13:
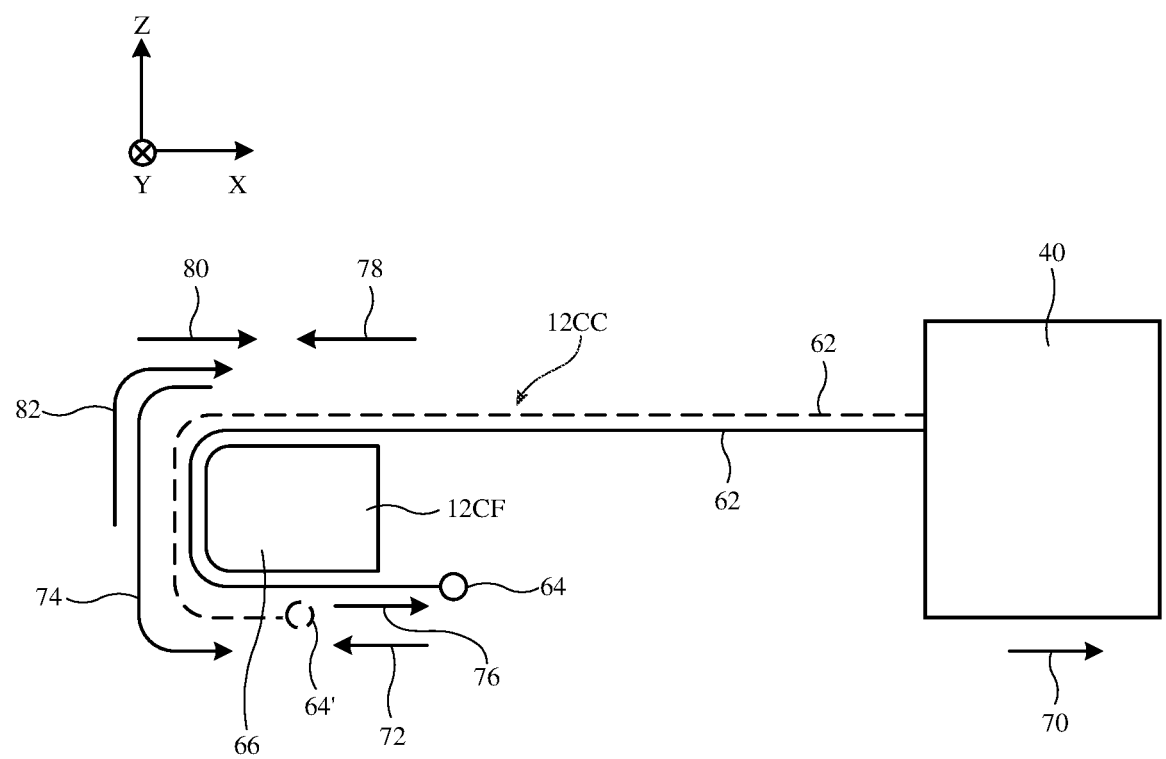
FIG. 13 is a cross-sectional side view showing how a cover layer with a peripheral elastic band may move relative to a rigid frame in accordance with an embodiment.

FIG. 13 shows how elastic band 64 may help provide fabric 62 of cover 12CC with the ability to slide laterally relative to frame to accommodate movement in optical modules 40 while helping to keep fabric 62 taut. Elastic band 64 is normally in a stretched state. As a result, band 64 attempts to contract and, in doing so, tends to pull fabric 62 around frame 12CF in direction 74. On the inner side of frame 12CF, the tightening force from band 64 is therefore normally pulling fabric 62 in direction 76, whereas on the opposing outer (rear-facing) side of frame 12CF, the tightening force of band 64 tends to pull fabric 62 towards the periphery of frame 12CF in direction 78. The presence of band 64 therefore helps tighten fabric 62 and prevent wrinkles in cover layer 12CC.

When it is desired to move optical module 40, fabric 62 can slide back and forth over frame 12CF as needed. Consider, as an example, a scenario in which module 40 is moved in direction 70. This pulls fabric 62 on the outer side of frame 12CF (e.g., frame portion 66) in direction 80. On the inner side of frame 12CF, the edge of fabric 62 is pulled in direction 72, causing band 64 to stretch and expand slightly (e.g., so that band 64 moves to position 64'). Due to the pull on fabric 62 in direction 80, fabric 62 slides around frame 12CF and across the outer surface of frame 12CF in direction 82, thereby helping to accommodate movement of module 40 without wrinkling cover layer 12CC.

Figure 14:
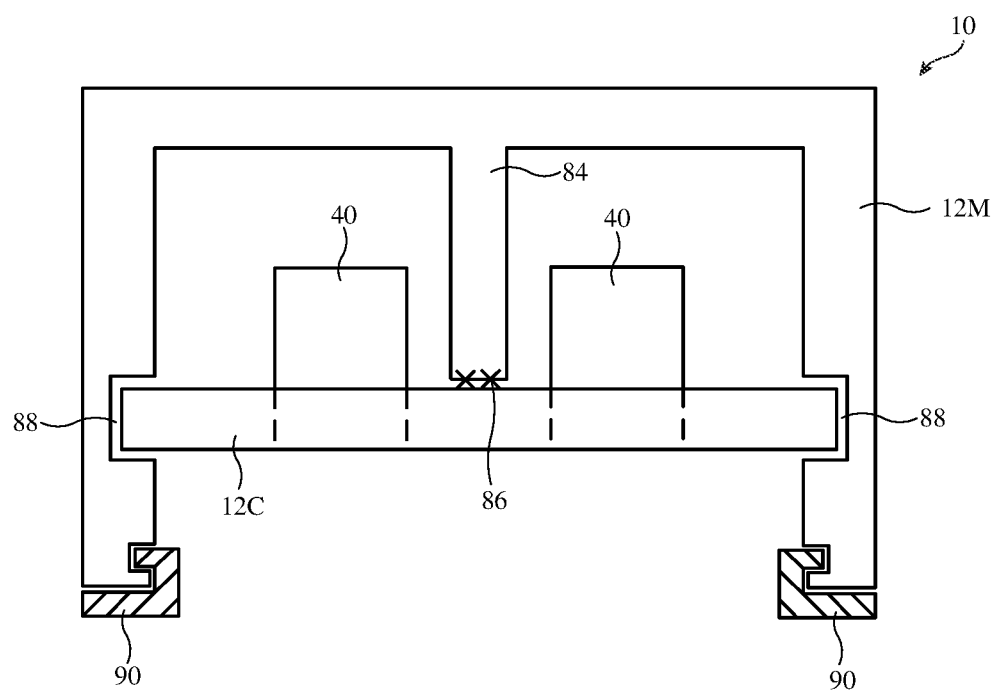
FIG. 14 is a cross-sectional top view of an illustrative head-mounted device with a floating curtain in accordance with an embodiment.

To facilitate sliding movement of cover 12CC around the edges of frame 12CF in this way, at least the left and right edges of cover 12CC (and adjacent portions along the upper and lower edges of cover 12CC) may not be fixedly attached to frame 12CF or housing 12. An illustrative configuration for mounting curtain 12C within housing portion 12M of housing 12 of device 10 is shown in FIG. 14. In the example of FIG. 14, housing portion 12M has a central support such as housing structure 84. Curtain 12C may be fixedly attached to structure 84 using attachment mechanism 86. Mechanism 86 may include, for example, glue and/or mechanical structures that grip fabric 62 and/or other portions of curtain 12C to hold curtain 12C firmly in place within device 10. Mechanism 86 may, if desired, include engagement structures (e.g., snap features) that allow curtain 12C to be removed and replaced with another curtain. When mounted in device 10, however, mechanism 86 will hold curtain 12C securely.

As shown in FIG. 14, device 10 may, if desired, have a ring-shaped opaque light seal such as light seal 90. Light seal 90 may be configured to be removable (e.g. so that light seal 90 may be replaced when worn). Foam or other soft materials may be used in forming light seal 90.

Figure 15:
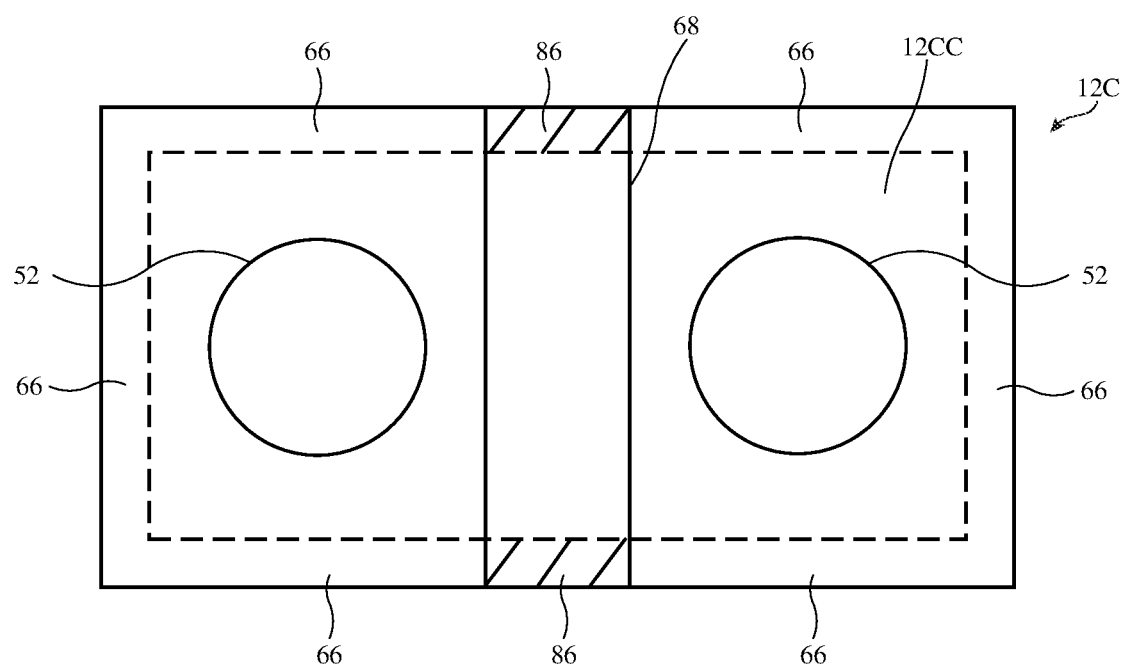
FIG. 15 is a rear view of an illustrative curtain showing locations for attaching the curtain to a head-mounted device housing member in accordance with an embodiment.

The attachment structures used in mechanism 86 of FIG. 14 may or may not permit fabric 62 to slide freely with respect to frame 12CF. To permit fabric 62 to slide freely with respect to frame 12CF of curtain 12C elsewhere in curtain 12C (e.g., at the left and right edges of curtain 12C and at other portions of curtain 12C away from attachment mechanism 86), curtain 12C may float with respect to housing 12M (except at attachment mechanism 86). As an example, the opposing ends of curtain 12C at the left and right edges of curtain 12C may be separated from nearby portions of housing portion 12M by air gaps 88. This prevents the fabric of layer 12CC from becoming caught between frame 12CF and housing 12. FIG. 15 shows how attachment structures 86 may, if desired, be used to couple a bridging central portion of frame 12CF such as portion 68 to housing structure 84 in the center of frame 12CF (e.g., along the upper and lower edges of curtain 12C).

Figure 16:
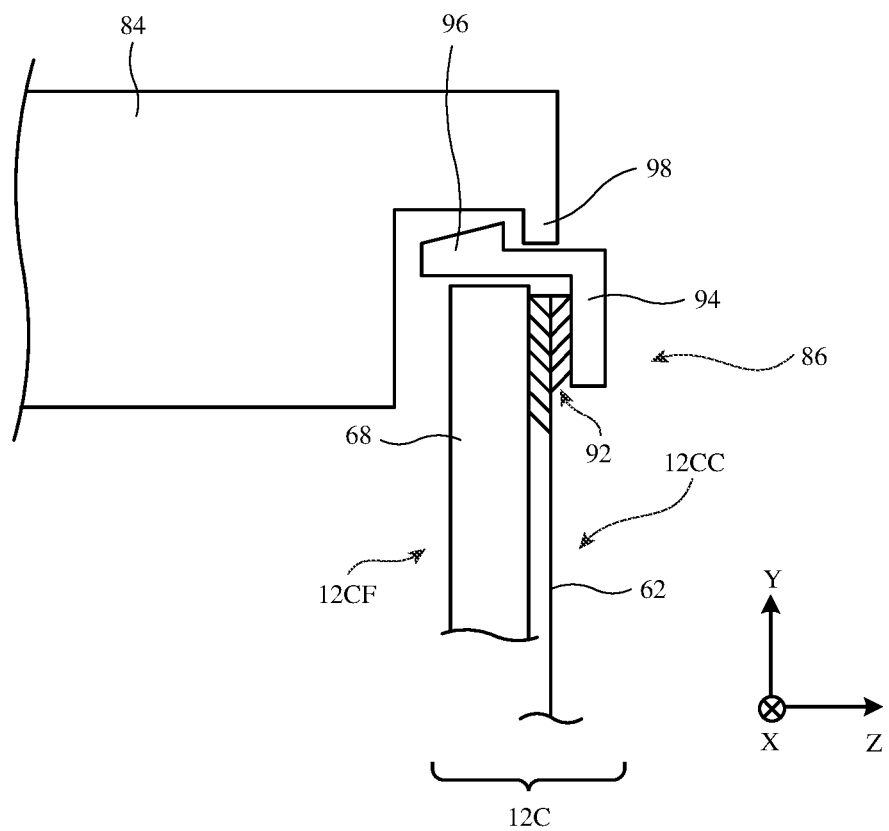
FIG. 16 is a cross-sectional side view of a portion of an illustrative head-mounted device showing how a curtain may be attached to a head-mounted device housing member in accordance with an embodiment.

FIG. 16 is a cross-sectional view of curtain 12C showing how attachment mechanism 86 for attaching curtain 12 to housing structure 84 may include trim member 94. Adhesive 92 may be used to attach fabric 62 and frame 12CF to trim member 94 (e.g., in the vicinity of attachment mechanism 86 in the areas of curtain 12C that overlap bridging portion 86 of frame 12CF). Trim member 94 and housing structure 84 may have mating engagement structures. For example, trim member 94 may have a snap such as snap 96 that mates with a corresponding hook such as hook 98 on housing structure 84. When it is desired to snap curtain 12C in place, curtain 12C may be pressed into housing 12M in the −Z direction. If desired, curtain 12C may be removed by disengaging (e.g., unsnapping) the engagement structures (e.g., when it is desired to remove or replace curtain 12C).

Figure 17:
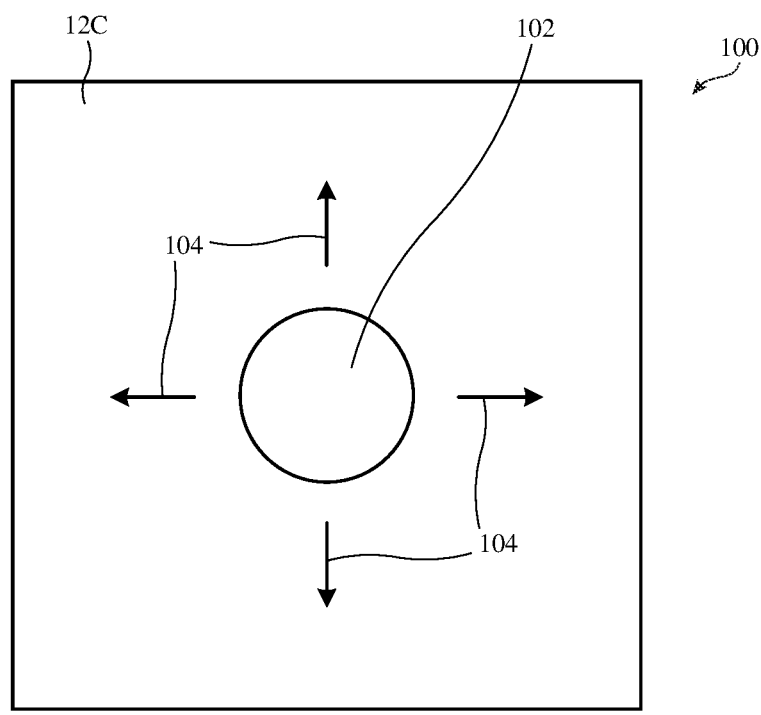
FIG. 17 is a top view of an illustrative apparatus with a movable member surrounded by a curtain in accordance with an embodiment.

If desired, curtain 12C may be used in equipment other than devices 10. Consider, as an example, the arrangement of FIG. 17. As shown in FIG. 17, apparatus 100 may have a movable member such as movable member 102. Apparatus 100 may be, for example, a joystick or automobile stick shift and movable member 102 may be a movable shaft. Movable member 102 may move in one or more directions 104. Curtain 12C may have a cover layer 12CC formed from fabric 62 or other covering material and may have peripheral elastic band 64. Cover layer 12CC may be mounted over a frame such as frame 12CF. This allows cover layer 12CC to slip and/or stretch during movement of member 102 to help avoid wrinkling in curtain 12C.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
a housing separating an interior region from an exterior region that surrounds the housing;
first and second optical modules in the housing that are configured to provide images respectively to first and second eye boxes; and
a cover configured to block the interior region from view, wherein the cover comprises fabric, a frame, and first and second cover openings that are respectively aligned with the first and second optical modules, wherein the fabric has a peripheral edge that is coupled to the frame while allowing the fabric to slide relative to the frame in response to movement of the first optical module relative to the second optical module.

2. The head-mounted device defined in claim 1 wherein the frame has first and second frame openings that respectively overlap the first and second optical modules, wherein the cover comprises an elastic band running around the peripheral edge of the fabric, and wherein the elastic band holds the fabric to the frame while allowing the fabric to slide relative to the frame.

3. The head-mounted device defined in claim 2 further comprising a fan in the housing, wherein the fan is configured to draw air into the interior region through the fabric.

4. The head-mounted device defined in claim 2 wherein the frame has a peripheral ring-shaped portion bridged by a bridging central portion and wherein the cover is attached to a structure in the housing at the bridging central portion while allowing other portions of the cover to float with respect to the housing.

5. The head-mounted device defined in claim 1 wherein the fabric comprises stretchable fabric.

6. The head-mounted device defined in claim 5 wherein the fabric comprises first strands of a first elastic modulus and second strands of a second elastic modulus that is greater than the first elastic modulus.

7. The head-mounted device defined in claim 1 wherein the cover is removably attached to the housing.

8. The head-mounted device defined in claim 1 wherein the fabric comprises a stretchable air permeable opaque layer.

9. The head-mounted device defined in claim 1 wherein each of the first and second optical modules has a respective display and lens secured in a lens barrel, the head-mounted device further comprising actuators configured to laterally move the lens barrels relative to the housing while the cover stretches to accommodate the lateral movement of the lens barrels and maintain alignment of the first and second cover openings with the first and second optical modules, respectively.

10. The head-mounted device defined in claim 9 wherein the fabric is configured to stretch by at least 50% without failure.

11. The head-mounted device defined in claim 1 wherein the fabric comprises a stretchable layer wherein the first and second cover openings are formed in the stretchable layer.

12. A head-mounted device, comprising:
a housing;
left and right optical modules supported by the housing, wherein the left optical module has a left display and left lens configured to provide a left image to a left eye box, wherein the right optical module has a right display and a right lens configured to provide a right image to a right eye box, and wherein the left and right optical modules are configured to move relative to each other; and
a cover that has a frame, fabric, a left opening that is aligned with the left optical module, and a right opening that is aligned with the right optical module, wherein the cover is configured to block an interior region of the housing from view, and wherein the fabric has a peripheral edge that is coupled to the frame while allowing the fabric to slide relative to the frame in response to movement of the right and left optical modules with respect to each other to accommodate different interpupillary distances.

13. The head-mounted device defined in claim 12 wherein the left and right openings are formed in the fabric.

14. The head-mounted device defined in claim 13 wherein the frame has a ring-shaped peripheral portion bridged by a central bridging portion and has first and second frame openings that overlap the left and right openings of the fabric.

15. The head-mounted device defined in claim 14 wherein the fabric is attached to the frame with adhesive in the central bridging portion and is configured to slide relative to other portions of the frame.

16. The head-mounted device defined in claim 15 wherein an area of the ring-shaped peripheral portion is separated from the housing by an air gap to prevent the fabric from becoming caught between the frame and the housing as the fabric slides.

17. The head-mounted device defined in claim 12 wherein the fabric is configured to remain taut as the right and left optical modules are moved with respect to each other.

18. A head-mounted device, comprising:
a housing;
a strap coupled to the housing;
left and right optical modules supported by the housing, wherein the left optical module has a left display and left lens configured to provide a left image to a left eye box, wherein the right optical module has a right display and a right lens configured to provide a right image to a right eye box, and wherein the left and right optical modules are configured to move relative to each other; and
a cover that has a fabric layer coupled to a frame, wherein the fabric layer extends across a rear face of the housing and blocks an interior region of the housing from view, wherein the fabric layer has a left opening that is aligned with the left optical module and a right opening that is aligned with the right optical module, and wherein the fabric layer has a peripheral edge that is coupled to the frame while allowing the fabric to slide relative to the frame in response to movement of the right and left optical modules with respect to each other to accommodate different interpupillary distances.

* * * * *